United States Patent [19]

Jeong et al.

[11] Patent Number: 5,479,079
[45] Date of Patent: Dec. 26, 1995

[54] APPARATUS AND METHOD FOR CONTROLLING ROBOT TRAVEL

[75] Inventors: Joon-Young Jeong, Seoul; Seok-Jin Han, Suwon, both of Rep. of Korea

[73] Assignee: Samsung Electronics Co., Ltd., Suwon, Rep. of Korea

[21] Appl. No.: 295,064

[22] Filed: Aug. 26, 1994

[30] Foreign Application Priority Data

Aug. 26, 1993 [KR] Rep. of Korea ............... 93-16710

[51] Int. Cl.⁶ .................................................. G01C 25/00
[52] U.S. Cl. ...................... 318/568.120; 318/638
[58] Field of Search ................ 318/568.12, 568.16, 318/568.22, 632, 638, 470, 489; 364/424.05; 340/988; 901/1, 46, 50

[56] References Cited

U.S. PATENT DOCUMENTS

| | | | |
|---|---|---|---|
| 4,943,758 | 7/1990 | Tsurumiya | 318/504 |
| 5,001,637 | 3/1991 | Shiraishi et al. | 364/424.05 |
| 5,115,238 | 5/1992 | Shimizu et al. | 340/988 |
| 5,343,393 | 8/1994 | Hirano et al. | 364/424.05 |

FOREIGN PATENT DOCUMENTS 4-238216  8/1992  Japan.

*Primary Examiner*—Bentsu Ro
*Attorney, Agent, or Firm*—Burns, Doane, Swecker & Mathis

[57] ABSTRACT

A travelling robot body carries a first detector which is turnable with the body for sensing changes in direction of travel of the robot body. In order to compensate for errors by the first detector, the robot body carries a compensation system for determining an error compensation factor that can be applied to signals emitted by the first detector. That system which performs its function prior to operation of the robot, comprises a drive mechanism for turning the first detector relative to the robot body while the body is stationary, whereby the first detector emits a first signal representative of a sensed turning angle of the first detector. A second detector is mounted on the robot body for determining the actual turning angle of the first detector which occurred. By comparing the sensed turning angle from the first detector with the actual turning angle from the second detector, an error connecting factor can be calculated by a control mechanism. During travel of the robot body, the turning angles sensed by the first detector are corrected by the control mechanism in accordance with the error correction factor.

11 Claims, 7 Drawing Sheets

APPARATUS AND METHOD FOR CONTROLLING ROBOT TRAVEL

BACKGROUND OF THE INVENTION

1. Field of the Invention

The present invention relates to a robot (manless car, self-movable robot, or car navigation system) movable along a predetermined path by itself, and more particularly to an apparatus for and a method of controlling driving of such a robot, capable of accurately moving the robot by correcting an output error of an angular velocity sensor adapted to detect a variation in travel direction of the robot.

2. Description of the Prior Art

Generally, a device for driving a movable robot includes an angular velocity sensor adapted to detect a variation in travel direction of the robot. However, such an angular velocity sensor involves an inherent output error. Such an inherent output error of the angular velocity sensor is generated every time when the travel direction of the robot is varied. The generated output errors are accumulated. Due to the accumulated output error, the robot may be difficult to direct in accordance with the user's intention (program).

For solving such a problem, there have been proposed various techniques of compensating the output error of angular velocity sensor. For example, Japanese Patent Laid-open Publication No. Heisei 04-238216 discloses a method for deriving a scale factor of a gyro. In accordance with this method, the robot provided with an angular velocity sensor for detecting a variation in travel direction is turned predetermined times at a fixed position, while the angular velocity sensor senses the turning angle of the robot for every turn of the robot. Turning angle data from the angular velocity sensor is accumulated so as to derive an output error of the angular velocity sensor by dividing the accumulated value by the actual turning angle of the robot. Based on the derived output error, the scale factor is adjusted.

In other words, as one of left and right wheels of the robot, for example, the right wheel is driven at a fixed state of the other wheel, that is, the left wheel, it turns about the left wheel along a circular track having a radius r corresponding to the distance between the left and right wheels. In this case, the actual turning angle can be calculated from the turning distance sensed by a travel distance sensor attached to the right wheel because the ratio of circumference of the circular track to its diameter is found. For example, where the travel distance is $2\pi r$, the actual turning angle is $360°$. The accumulated value of the turning angle data from the angular velocity sensor is divided by the calculated actual turning angle to derive the output error of the angular velocity sensor and thereby adjust the scale factor by the derived output error.

However, a slippage may occur at the driving wheel of the moving robot due to the material and condition of a bottom surface on which the robot travels. In the case of the above-mentioned conventional method, such a slippage is added as the travel distance even though the robot does not travel actually. As a result, the output error of the angular velocity sensor may be increased. This results in a difficulty to achieve an accurate control for driving of the robot.

The output error of the angular velocity sensor may be also increased due to a variation in surrounding conditions such as a surrounding temperature or a vibration. Although such an output error may be corrected using an absolute position display or an earth magnetic orientation sensor, this method involves problems of a complexity in construction and a long correction time.

SUMMARY OF THE INVENTION

Therefore, an object of the invention is to solve the above-mentioned problems encountered in the prior art and, thus, to provide an apparatus for and a method of controlling driving of a robot, capable of achieving an accurate control for driving of the robot by a simple and inexpensive arrangement without using any absolute position display or earth magnetic orientation sensor by computing an output error correction coefficient from a turning angle detected by turning an angular velocity sensor independently of a robot body and the actual turning angle of the angular velocity sensor separately detected by a turning angle detecting unit, and correcting an output error of the angular velocity sensor upon driving of the robot, based on the computed output error correction coefficient.

In accordance with one aspect, the present invention provides an apparatus for controlling driving of a robot, comprising: turning angle detecting means for detecting a rotation angle corresponding to a variation in direction of the robot; driving means for rotating the turning angle detecting means at a stopped state of the robot before a travel; rotation amount detecting means for detecting an actual rotation angle of the turning angle detecting means from the driving means when the driving means rotates the turning angle detecting means; and control means for computing an output error correction coefficient of the turning angle detecting means, based on both the rotation angle detected by the turning angle detecting means and the actual turning angle of the robot detected by the rotation amount detecting means, and controlling the travel of the robot while correcting an output error of the turning angle detecting means by the computed output error correction coefficient during a turning travel of the robot.

In accordance with another aspect, the present invention provides a method of controlling driving of a robot, comprising: a correction coefficient computing step of detecting a rotation angle from turning angle detecting means by rotating the rotation angle means by driving means at a stopped state of the robot independently of a body of the robot, detecting a required rotation angle of the turning angle detecting means from the driving means, and thereby computing an output error correction coefficient; a turning angle detecting step of detecting a turning angle of the robot at predetermined time intervals during a travel of the robot; a correction angle calculating step of calculating a correction angle for the turning angle of the robot detected at the turning angle detecting step during a turning travel of the robot, based on the output error correction coefficient computed at the correction coefficient computing step; a robot travelling step of travelling the robot while correcting the turning angle of the robot by the correction angle calculated at the correction angle calculating step; and a travel completion discriminating step of discriminating whether the travel of the robot has been completed.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
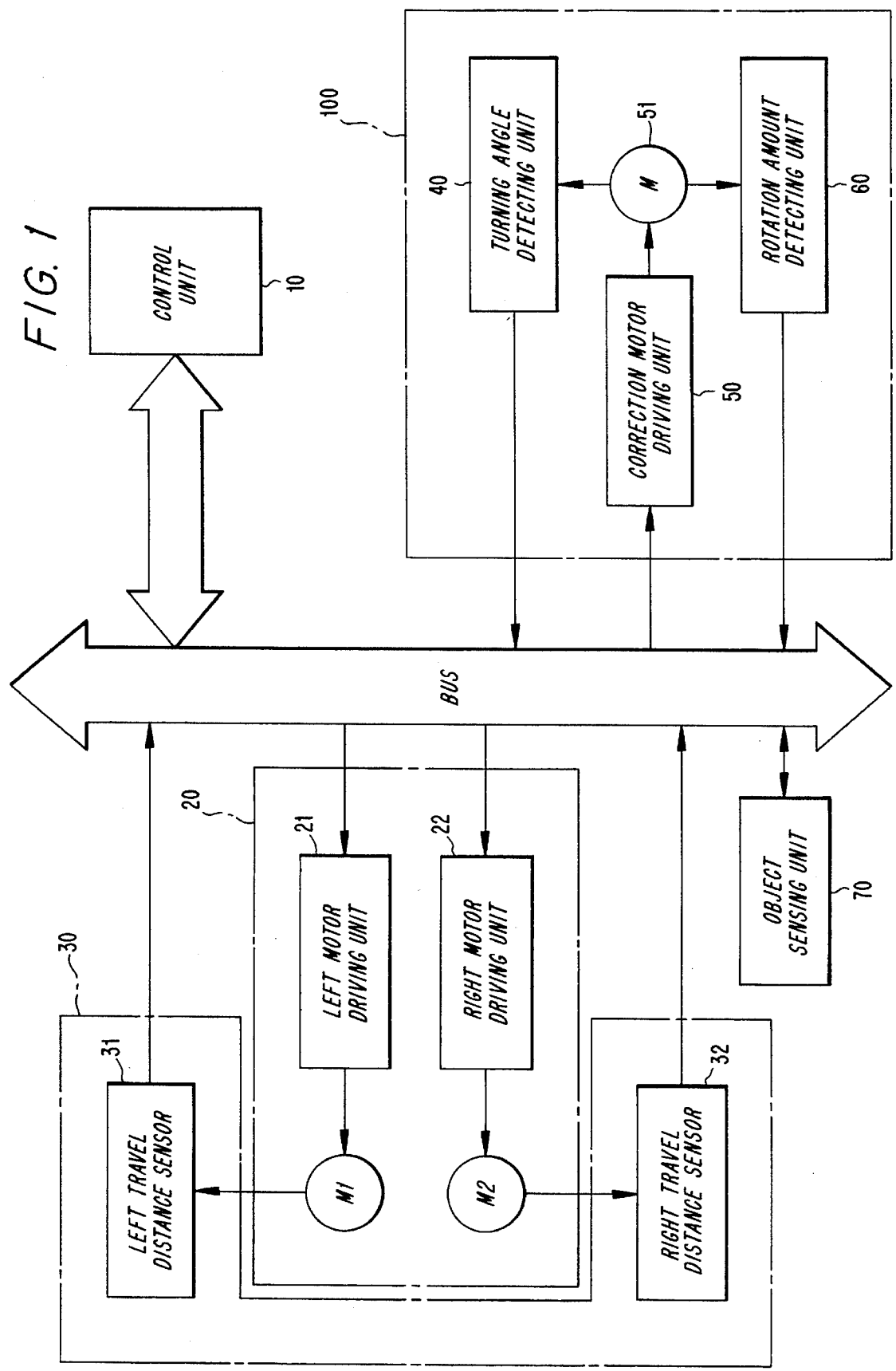
FIG. 1 is a block diagram of an apparatus for controlling driving of a robot in accordance with the present invention.

Referring to FIG. 1, there is illustrated an apparatus for controlling the driving of a robot in accordance with the present invention.

As shown in FIG. 1, the control apparatus includes a control unit 10 for controlling the overall travel of the robot. The control unit 10 comprises a microprocessor.

The control apparatus also includes a travelling unit 20 for driving the robot under a control of the control unit 10. The travelling unit 20 includes a left motor driving unit 21 for controlling operation of a left travelling motor M1 adapted to drive (rotate) a left wheel of the robot and a right motor driving unit 22 for controlling operation of a right travelling motor M2 adapted to drive (rotate) a right wheel of the robot.

The control apparatus further includes a travel distance detecting unit 30 for detecting the travel distance of the robot moved by the travelling unit 20. The travel distance detecting unit 30 includes a left travel distance sensor 31 for generating a pulse signal corresponding to the number of rotations of the left travelling motor M1 and thereby detecting the travel distance of the robot moved by the rotation of the left wheel, and a right travel distance sensor 32 for generating a pulse signal corresponding to the number of rotations of the right travelling motor M2 and thereby detecting the travel distance of the robot moved by the rotation of the right wheel.

An output error correction device 100 is also provided which is adapted to correct an output error of a turning angle detecting unit to be described hereinafter. The output error correction device 100 includes a turning angle detecting unit 40 for generating a voltage corresponding to a variation in direction, a correction motor driving unit 50 for driving a correction motor 51 to rotate the turning angle detecting unit 40 independently of the robot, and a rotation amount detecting unit 60 for detecting an actual rotation angle of the turning angle detecting unit 40 to derive an output error correction coefficient of the turning angle detecting unit 40.

The turning angle detecting unit 40 of the output error correction device 100 comprises an angular turning velocity sensor. On the other hand, the rotation amount detecting unit 60 comprises a magnetic field sensor (often, called "Hall sensor") adapted to sense the number of rotations of the correction motor 51 and generate a signal proportional to the sensed rotation number of the correction motor 51.

The control apparatus further includes an object sensing unit 70 attached to the front portion of the robot or the left and right portions of the robot. The object sensing unit 70 generates an ultrasonic wave using an ultrasonic sensor and receives a signal which is the generated ultrasonic wave struck against a wall or an object positioned in front of the robot or in left or right of the robot and then reflected therefrom, thereby sensing the object.

Figure 2:
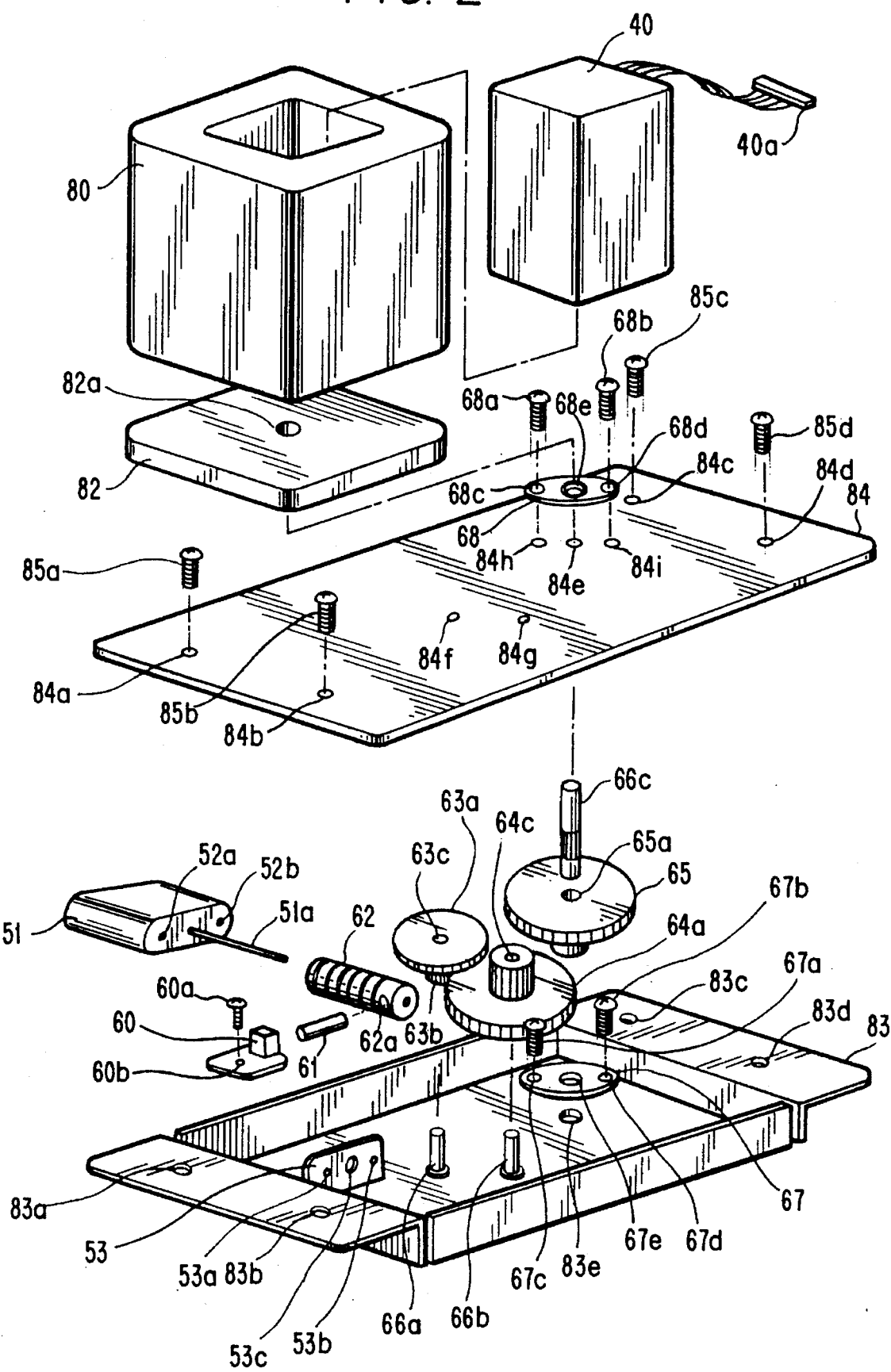
FIG. 2 is an exploded perspective view illustrating an output error correction device shown in FIG. 1.

FIG. 2 is an exploded perspective view illustrating the output error correction device 100 shown in FIG. 1.

As shown in FIG. 2, the output error correction device 100 includes a case 83 having at its one side a fixing plate 53 for fixedly mounting the correction motor 51 driven by the correction motor driving unit 50 (FIG. 1).

At the central portion of the fixing plate 53, a hole 53c is formed. At opposite sides of the hole 53c, the fixing plate 53 is also provided with apertures 53a and 53b in which screws are coupled, respectively. Through the hole 53c of the fixing plate 53, a shaft 51a of the correction motor 51 extends. The correction motor 51 is fixedly mounted to the fixing plate 53 by extending screws (not shown) through the apertures 53a and 53b provided in the fixing plate 53, respectively, and then coupling the screws in apertures 52a and 52b provided in the correction motor 51, respectively.

A worm gear 62 is fixedly mounted on the shaft 51a of the correction motor 51. The worm gear 62 has at its terminal end a hole 62a extending perpendicular to the shaft 51a of the correction motor 51. In the hole 62a, a magnetic member 61 is firmly fitted. At one side of the magnetic member 61, the rotation amount detecting unit 60 is disposed. The rotation amount detecting unit 60 is fixedly mounted on the case 83 by coupling a screw in an aperture 60b provided in the rotation amount detecting unit 60.

On the other hand, a first reduction gearing is engaged with the worm gear 62. The first reduction gearing is rotatably mounted on a shaft 66a fixed to the case 83. The first reduction gearing includes a helical gear 63a engaged with the worm gearing 62, and a general gear 63b having fewer teeth (or smaller diameter) smaller than that of the helical gear 63a. The first reduction gearing also has a vertical throughout hole 63c in which the shaft 66a fixed to the case 83 is firmly fitted. With such a construction, the first reduction gearing rotates about the shaft 66a as the worm gear 62 rotates.

A second reduction gearing is engaged with the first reduction gearing. The second reduction gearing is rotatably mounted on a shaft 66b fixed to the case 83. The second reduction gearing includes a larger gear 64a engaged with the general gear 63b of the first reduction gearing, and a smaller gear 64b having fewer teeth (or smaller diameter) than that of a larger gear 64a. The second reduction gearing also has a vertical through hole 64c in which the shaft 66b fixed to the case 83 is fitted. With such a construction, the second reduction gearing rotates about the shaft 66b as the first reduction gearing rotates.

The larger gear 64a of the second reduction gearing has more teeth than the gear 63b of the first reduction gearing.

A third reduction gear 65 is engaged with the second reduction gear. The third reduction gear 65 is fixedly mounted on a shaft 66c rotatably inserted in a hole 83e provided in the case 83. The third reduction gear 65 has more teeth than the smaller gear 64b of the second reduction gear. The third reduction gear 65 is provided with a through hole 65a in which the shaft 66c is firmly fitted to rotate integrally with the third reduction gear 65.

In order to easily rotate the shaft 66c, a bearing member 67 is interposed between the third reduction gear 65 and the case 83. The bearing member 67 is provided at its central portion with apertures 67c and 67d through which screws 67a and 67b extend, respectively, and a hole 67e in which the shaft 66c is firmly fitted. The screws 67a and 67b extending through the apertures 67c and 67d are coupled to the case 83 so as to fix the bearing member 67 to the case

83.

On the case 83, a shield plate 84 is mounted. The shield plate 84 has a plurality of coupling apertures 84a to 84d through which screws 85a to 85d extend, respectively. The screws 85a to 85d extending through the coupling apertures 84a to 84d are coupled in coupling apertures 83a to 83d provided in the case 83. With such a construction, the shield plate 84 is coupled to the case 83.

The shafts 66a and 66b fixedly mounted to the case 83 extend through the holes 63c and 64c of the first and second reduction gear and are firmly fitted in holes 84f and 84g provided in the shield plate 84. On the other hand, the shaft 66c rotating integrally with the third reduction gear 65 extends through a hole 84e provided at the shield plate 84 and a hole 68e centrally provided in a bearing member 68.

The bearing member 68 is provided with apertures 68c and 68d through which screws 68a and 68b extend, respectively. The screws 68a and 68b extending through the apertures 68c and 68d are coupled in coupling apertures 84h and 84i provided in the shield plate 84 so as to fix the bearing member 68 to the shield plate 84.

The shaft 66c of the third reduction gear 65 which extends through the hole 84e of the shield plate 84 and the central hole 68e of the bearing member 68 is firmly fitted in a hole 82a centrally formed in a fixing plate 82. Fixedly mounted on the fixing plate 82 is the turning angle detecting unit 40 which applies a voltage indicative of a variation in direction to a terminal 40a.

An anti-vibration member 80 surrounds the turning angle detecting unit 40. The anti-vibration member 80 serves as a damper for preventing the turning angle detecting unit 40 from being subjected to a vibration generated during the travel of robot or the rotation of correction motor 51. The turning angle detecting unit 40 which comprises the angular velocity sensor detects a variation in direction of the robot and sends it to the terminal 40a.

Figure 3:
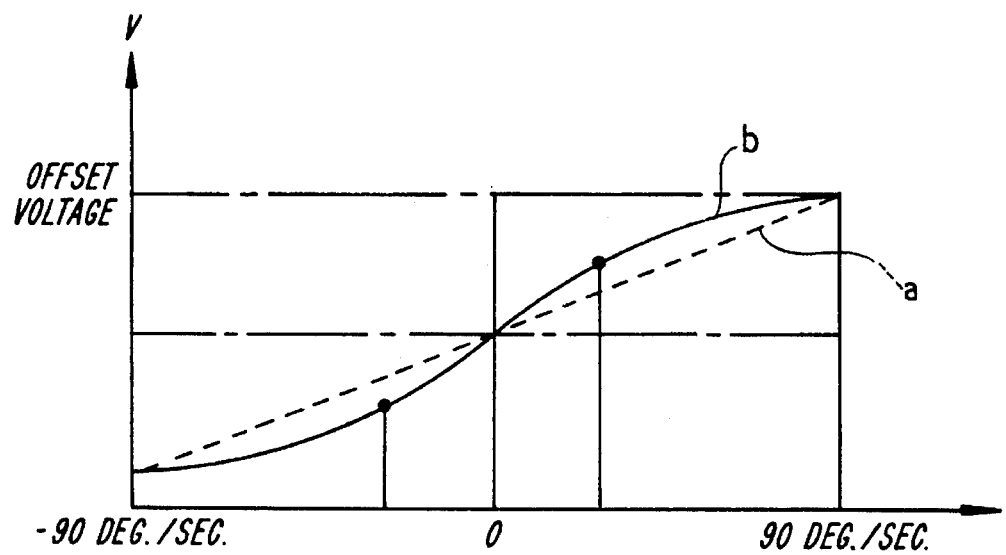
FIG. 3 is a diagram illustrating an output characteristic of a turning angle detecting unit shown in FIG. 1.

Generally, the angular velocity sensor 40 outputs a voltage varied from a reference, offset voltage, depending on a variation in rotation turning velocity of the robot, as shown in the output characteristic curve of FIG. 3. It is ideal that the output voltage V from the angular turning velocity sensor 40 increases or decreases in proportion to the rotation turning velocity of the robot, as indicated by the dotted line a in FIG. 3. However, the angular turning velocity sensor outputs generally a voltage varied as indicated by the solid line b in FIG. 3.

When the offset voltage is 2.5 V and the turning velocity of the robot is −90 deg/sec, the angular velocity sensor outputs a voltage of 0.5 V. The angular velocity sensor outputs a voltage of 4.5 V when the turning velocity of the robot is +90 deg/sec.

Accordingly, the turning angle detecting unit 40 comprising the angular turning velocity sensor having the above-mentioned characteristic outputs a voltage varied depending on a variation in turning velocity to the terminal 40a.

Now, operation of the control apparatus having the above-mentioned arrangement will be described.

When an operation switch (not shown) is switched on by a user, the control unit 10 drives the correction motor 51 during a stopped state of the robot (non-traveling). As the correction motor shaft 51a rotates, the turning angle detecting unit 40 rotates independently of the robot body.

In other words, the worm gear 62 mounted on the shaft 51a of correction motor 51 is rotated by the correction motor 51. By the rotation of the worm gear 62, the helical gear 63a of the first reduction gear engaged with the worm gear 62 rotates about the shaft 66a, thereby causing the gear 63b integral with the helical gear 63a to rotate.

As a result, the gear 64a of the second reduction gearing engaged with the gear 63b rotates about the shaft 66b, thereby causing the gear 64b to rotate. Also, the third reduction gear 65 engaged with the gear 64b of the second reduction gearing rotates, thereby causing the shaft 66c of the third reduction gear 65 to rotate.

As the shaft 66c rotates, the fixing plate 82 fixedly mounted to the shaft 66c and the turning angle detecting unit 40 attached to the fixing plate 82 rotate.

Then, the control unit 10 of FIG. 1 measures an output voltage value detected by the turning angle detecting unit 40 per unit time Δt1 and integrates the measured values to compute the rotation angle of the turning angle detecting unit 40.

During the rotation of correction motor shaft 51a, the rotation amount detecting unit 60 senses the magnetic member 62a disposed at the terminal end of the worm gear 62 and thereby generates a pulse signal. Based on the pulse signal, the control unit 10 detects a rotation angle through which the turning angle detecting unit 40 actually rotates.

In other words, the number of rotations of the correction motor shaft 51a for one rotation of the turning angle detecting unit 40 can be calculated on the basis of the rotation ratio among the worm gear 62 mounted on the shaft 51a of correction motor 51 and the first, second and third reduction gearing. Accordingly, the control unit 10 can detect the actual rotation amount of the turning angle detecting unit 40 by counting the number of pulses generated from the rotation amount detecting unit 60 during the rotation of correction motor shaft 51a.

For example, where the known rotation ratio between the correction motor shaft 51a and the turning angle detecting unit 40 is 10,000:1, the turning angle detecting unit 40 carries out one rotation for 10,000 rotations of the correction motor shaft 51a.

For one rotation, however, the turning angle detecting unit 40 does not output the voltage accurately corresponding to the one rotation, due to its output error. Accordingly, it will be appreciated that the control unit 10 derives a left rotation error correction coefficient Ke by rotating the correction motor shaft 51a in the left direction. The control unit 10 also derives a right rotation error correction coefficient Kr by rotating the correction motor 51 in the right direction.

That is, the control unit 10 counts the number of pulses detected by the rotation amount detecting unit 60 while rotating the correction motor shaft 51a in the left direction by the correction motor driving unit 50. When the counted number of pulses reaches a predetermined number of pulses corresponding to a desired number of rotations (in the illustrated case, one rotation), the control unit 10 stops the correction motor 51 by the correction motor driving unit 50. Thereafter, the control unit 10 divides the desired rotation angle, namely, 360° (one rotation) by the detected rotation angle from the turning angle detecting unit 40 to derive the left rotation error correction coefficient Ke, as expressed by the following equation (1). The control unit 10 also derives the right rotation error correction coefficient Kr by rotating the correction motor shaft 51a in the right direction by the correction motor driving unit 50, as expressed by the following equation (2).

$$Ke = \frac{360°}{+\text{measured rotation angle}} \quad (1)$$

$$Kr = \frac{360°}{\text{-measured rotation angle}} \quad (2)$$

The reason why the left and right rotation error correction coefficients Ke and Kr are derived is to make the rotation velocity of the correction motor shaft 51a match with the turning velocity of the robot as much as possible and thereby achieve an accurate turning velocity control, taking into consideration the output characteristic of the turning angle detecting unit 40.

Subsequently, the left and right motor driving units 21 and 22 of the travelling unit 20 receive a control signal from the control unit 10 and thereby drives the left and right travelling motors M1 and M2. As the left and right travelling motors M1 and M2 are driven, the robot begins to travel.

The left travel distance sensor 31 generates a pulse signal corresponding to the number of rotations of the left travelling motor M1 and sends it to the control unit 10. Similarly, the right travel distance sensor 32 generates a pulse signal corresponding to the number of rotations of the right travelling motor M2 and sends it to the control unit 10.

Based on the pulse signal from the left travel distance sensor 31, the control unit 10 calculates the travel distance of the robot moved by the left travelling motor Mi. The control unit 10 calculates the travel distance of the robot moved by the right travelling motor M2, based on the pulse signal from the right travel distance sensor 32.

The turning angle detecting unit 40 detects the turning angle varied during the travel of the robot and sends the result to the control unit 10. On the other hand, the object sensing unit 70 senses an object positioned in front of the robot or in left or right of the robot and sends the result to the control unit 10.

The control unit 10 multiplies the turning angle data detected by the turning angle detecting unit 40 by the output error correction coefficient previously calculated while rotating the turning angle detecting unit 40 during the stopped state of the robot as explained earlier and then corrects turning angle data for the robot, based on the resultant value obtained by the multiplication. The control unit 10 then computes position data of the robot, based on the corrected turning angle data and the travel distance data for the robot detected by the travel distance detecting unit 30. Using the position data, the control unit 10 controls the robot to be accurately moved.

The overall control for driving of the robot in accordance with the present invention will now be described, in conjunction with FIGS. 5A to 6B.

Figure 5A:
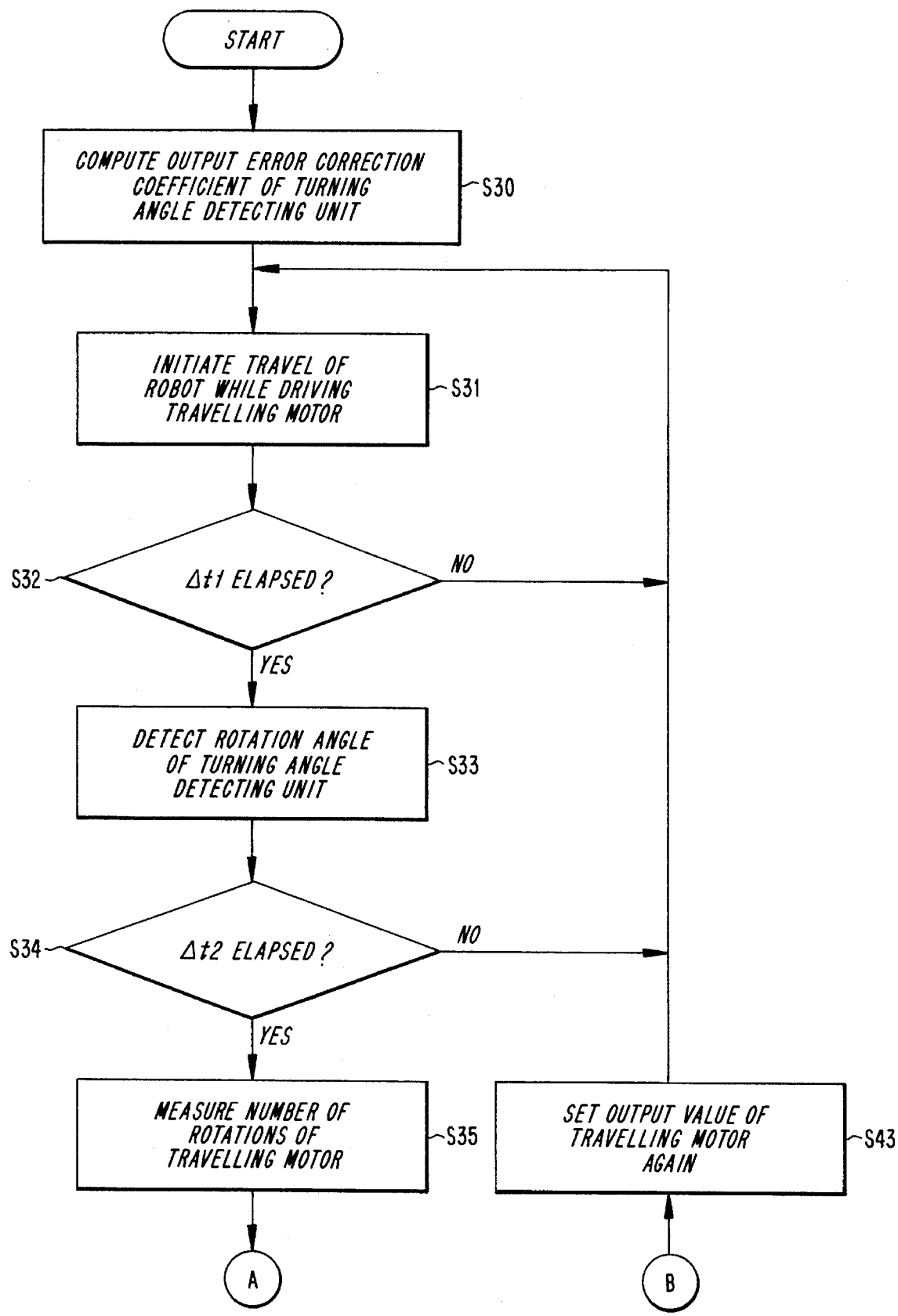
FIGS. 5A and 5B are flow charts respectively illustrating a method of controlling driving of a robot in accordance with the present invention.
Figure 5B:
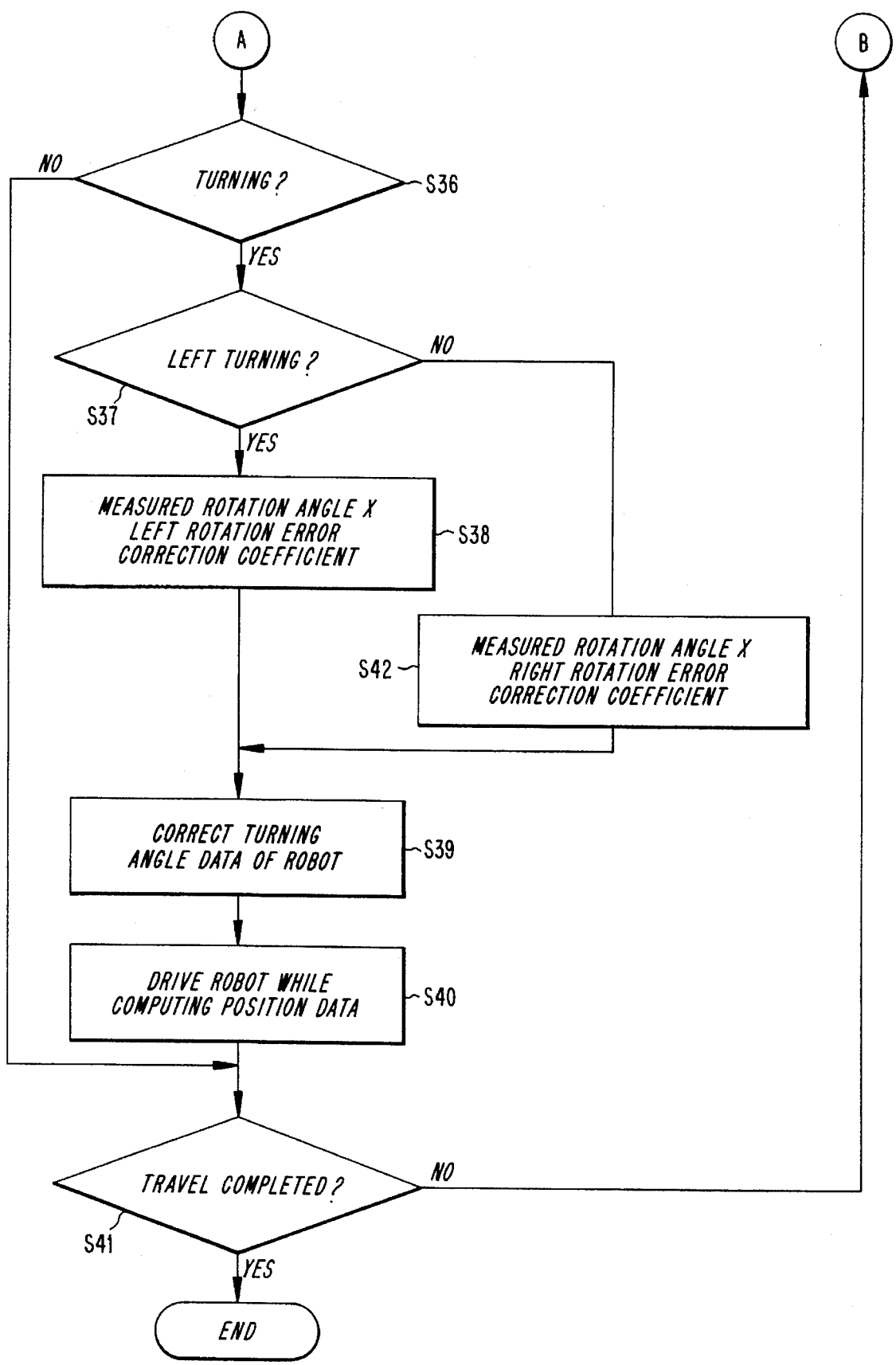

First, the description will be made, in conjunction with FIGS. 5A and 5B. When the user switches on the operation switch (not shown) so as to initiate robot travel, the control unit 10 rotates left and right the turning angle detecting unit 40 during a stopped state of the robot before the traveling commences, and then computes the left and right rotation output error correction coefficients Ke and Kr, based on outputs from the turning angle detecting unit 40 and the rotation amount detecting unit 60 (Step 30).

The left and right travelling motors M1 and M2 are then driven under a control of the control unit 10, thereby causing the robot to begin to travel at a step S31.

Figure 4:
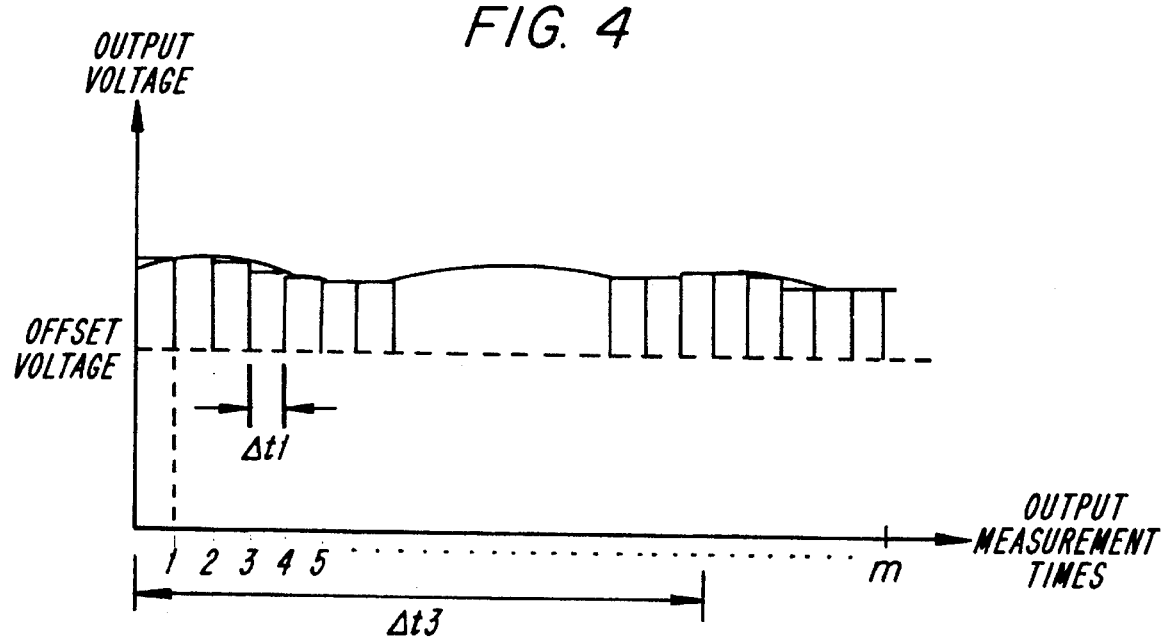
FIG. 4 is a diagram illustrating a condition of a voltage generated from the turning angle detecting unit in accordance with the present invention.

As the robot begins to travel, the control unit 10 measures an output voltage value of the turning angle detecting unit 40 at intervals of unit time Δt1 (FIG. 4) and integrates the measured values to compute the rotation angle (variation in angle) of the turning angle detecting unit 40 at steps S32 and S33.

At steps S34 and S35, the travel distance detecting unit 30 detects the number of rotations of the left and right travelling motors M1 and M2, respectively, to detect the travel distance of the robot every time when a predetermined time Δt2 has elapsed (in the case of YES) and then generates pulse signals respectively corresponding to the detected numbers of rotations. The control unit 10 receives the pulse signals from the travel distance detecting unit 30 and calculates travel distance data, based on the received signals.

At a step S36, the control unit 10 determines whether the robot is turning, based on the turning angle data derived at the steps S32 to S34.

When the travel direction has not been determined to constitute a turning travel (in the case of NO), at the step S36, it is unnecessary to correct the current position data of the robot because the robot has carried out currently a linear travel. In this case, the procedure proceeds to a step S41 for determining whether the travel of robot has been completed.

Where the travel direction has been determined to constitute a turning travel (in the case of YES), at the step S36, the procedure proceeds to a step S37. The control unit 10 determines whether the travel direction of the robot corresponds to the left direction, at the step S37.

Where the travel direction has been discriminated to correspond to the left direction (in the case of YES), at the step S37, it is required to correct an output error of the turning angle detecting unit 40. At a step S38, accordingly, the control unit 10 multiplies the output (turning angle data) of the turning angle detecting unit 40 obtained at the steps S32 to S34 by the left rotation error correction coefficient Ke calculated at the step S30.

At a step S39, the turning angle data for the robot is then corrected, based on the resultant value obtained by the multiplication at the step S38. At a step S40, the control unit 10 then computes position data of the robot, based on the travel direction data calculated by the turning angle data corrected at the step S39 and the travel distance data of robot detected at the step S35. Using the position data, the control unit 10 drives the robot.

Based on the position data obtained at the step S40, the control unit 10 determines whether the robot has completed its travel, at a step S41. When the robot has completed its travel (in the case of YES), the control unit 10 stops the driving of robot and completes its control operation.

On the other hand, where the travel direction has not been determined to correspond to the left direction (in the case of NO), at the step S37, that is, where the travel direction corresponds to the right direction, the control unit multiplies the output (turning angle data) of the turning angle detecting unit 40 obtained at the steps S32 to S34 by the right rotation error correction coefficient Kr calculated at the step S30. Thereafter, the procedure proceeds to the step S39 so that the control unit 10 performs repeatedly the step S39 and steps following the step S39.

Where the robot has not been determined as having completed its travel at the step S41 (in the case of NO), the control unit 10 sets output values of the left and right travelling motor M1 and M2 again to control rotation velocities of the eft and right travelling motor M1 and M2 at a step S43. Thereafter, the procedure returns to the step S31 so that the control unit 10 performs repeatedly the step S31 and steps following the step S31.

Figure 6A:
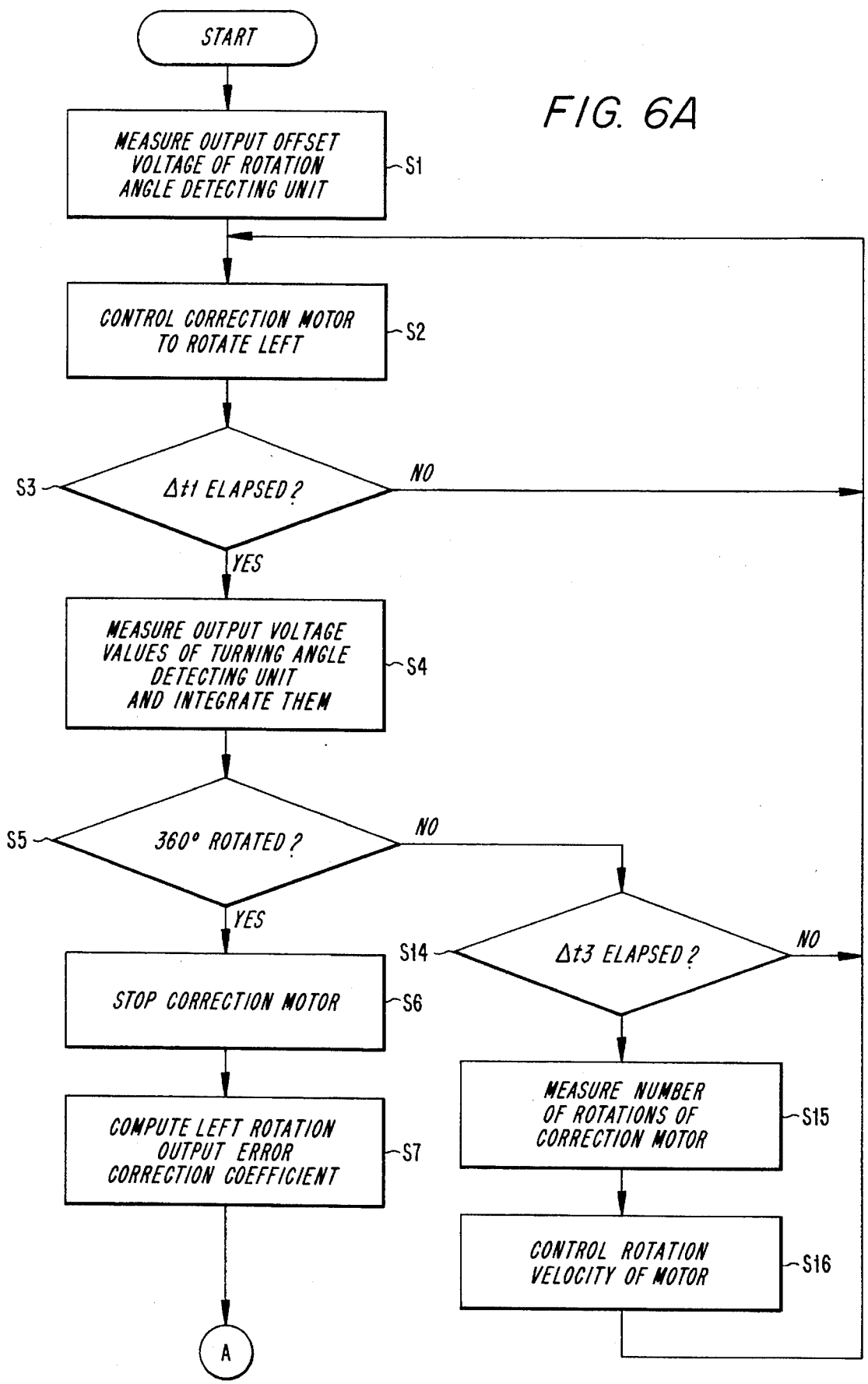
FIGS. 6A and 6B are flow charts respectively illustrating a method of computing an output error correction coefficient of the turning angle detecting unit.
Figure 6B:
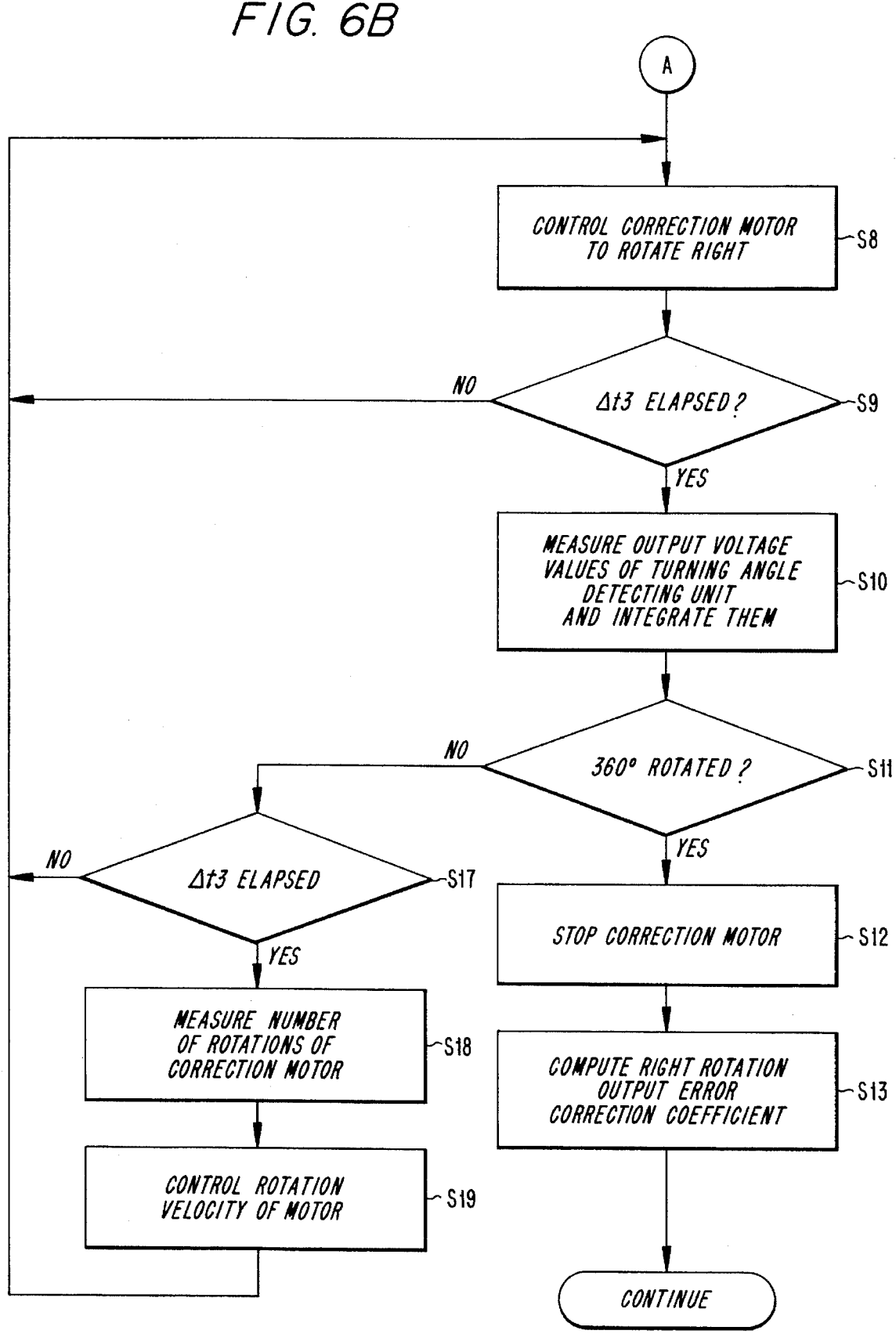

FIGS. 6A and 6B are flow charts illustrating a method of computing the output error correction coefficient of the turning angle detecting unit 40, respectively.

When the user switches on the operation switch not shown so as to drive the robot, the control unit 10 measures an output offset voltage (a reference voltage for determining the rotation angle) generated from the turning angle detecting unit 40 during a stopped state of the robot before a travel, at a step S1 of FIG. 6A.

At a step S2, the correction motor 51 rotates left under a control of the control unit 10 so as to rotate the turning angle detecting unit 40 in the left direction independently of the robot body.

At steps S3 and S4, the control unit 10 measures an output voltage value of the turning angle detecting unit 40 at intervals of unit time Δt1 and then integrates the measured values.

At a step S5, the control unit 10 receives a pulse signal generated from the rotation amount detecting unit 60 sensing the rotation of correction motor shaft 51*a* and then determines whether the turning angle detecting unit 40 has rotated through an angle of 360° (rotation angle for accurately deriving the output error correction coefficient of the turning angle detecting unit 40).

Where the turning angle detecting unit 40 has not been determined as having rotated 360° (in the case of NO), at the step S5, the control unit 10 determines, at a step S14, whether a predetermined control time Δt3 for the correction motor 51 (time interval for controlling the velocity of the correction motor 51) has elapsed.

Where the velocity control time Δt3 has not elapsed yet (in the case of NO), the procedure returns to the step S2 so that the control unit 10 performs repeatedly the step S2 and steps following the step S2 so as to continuously drive the correction motor 51.

On the other hand, where the velocity control time Δt3 has elapsed (in the case of YES), the number of rotations of the correction motor shaft 51*a* is measured to make the rotation velocity of correction motor shaft 51*a* match with the turning velocity of the robot during the robot travel, at a step S15.

At a step S16, the control unit 10 controls the rotation velocity of correction motor shaft 51*a* to match with the turning velocity of robot. Thereafter, the procedure returns to the step S2 so that the control unit 10 performs repeatedly the step S2 and steps following the step S2.

Where the turning angle detecting unit 40 has been determined as having rotated 360° (in the case of YES), at the step S5, the correction motor 51 is stopped under a control of the control unit 10 at a step S6.

At a step S7, the control unit 10 then divides the rotation angle of the turning angle detecting unit 40 discriminated by the rotation amount detecting unit 60, namely, 360° by the rotation angle of the turning angle detecting unit 40 detected at the steps S3 and S4 so as to derive the left rotation error correction coefficient Ke of the turning angle detecting unit 40.

The correction motor shaft 51*a* then rotates right under a control of the control unit 10 so as to rotate the turning angle detecting unit 40 in the right direction independent of the robot body, at a step S8.

At steps S9 and S10, the control unit 10 measures an output voltage value of the turning angle detecting unit 40 at intervals of unit time Δt1 and then integrates the measured values.

At a step S11, the control unit 10 receives a pulse signal generated from the rotation amount detecting unit 60 sensing the rotation of correction motor shaft 51*a* and then determines whether the turning angle detecting unit 40 has rotated through an angle of 360°.

Where the turning angle detecting unit 40 has not been determined as having rotated 360° (in the case of NO), at the step S11, the control unit 10 determines, at a step S17, whether a predetermined control time Δt3 for the correction motor 51 (time interval for controlling the velocity of the correction motor 51) has elapsed.

Where the velocity control time Δt3 has not elapsed yet (in the case of NO), the procedure returns to the step S8 so that the control unit 10 performs repeatedly the step S8 and steps following the step S8 so as to continuously drive the correction motor 51.

On the other hand, where the velocity control time t3 has elapsed (in the case of YES), the number of rotations of the correction motor shaft 51*a* is measured to make the rotation velocity of correction motor shaft 51*a* match with the turning velocity of robot during the travel of robot, at a step S18.

At a step S18, the control unit 10 controls the rotation velocity of correction motor shaft 51*a* to match with the turning velocity of robot. Thereafter, the procedure returns to the step S8 so that the control unit 10 performs repeatedly the step S8 and steps following the step S8.

Where the turning angle detecting unit 40 has been determined as having rotated 360° (in the case of YES), at the step S11, the correction motor 51 is stopped under a control of the control unit 10 at a step S12.

At a step S13, the control unit 10 then divides the rotation angle of the turning angle detecting unit 40 determined by the rotation amount detecting unit 60, namely, 360° by the rotation angle of the turning angle detecting unit 40 detected at the steps S9 and S10 so as to derive the right rotation error correction coefficient Kr of the turning angle detecting unit 40.

The present invention involves a method and apparatus for controlling the driving of a robot, achieving an accurate control for driving of the robot by a simple and inexpensive arrangement without using any absolute position display or earth magnetic orientation sensor by computing an output error correction coefficient from a turning angle detected by a turning angle detecting unit and an actual rotation amount of the turning angle detecting unit detected by a rotation amount detecting unit, and correcting position data depending on a variation in travel direction of the robot, based on the computed output error correction coefficient.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

Although the illustrated case employs a magnetic member and a magnetic field sensor attached to a motor shaft so as to measure the rotation velocity and rotation amount of the correction shaft, this effect may be equivalently obtained by using a chopper and a photo sensor. The correction motor may be substituted by a step motor requiring no sensor.

What is claimed is:

1. A movable robot, comprising:

a movable body;

a first turning angle detector mounted on said body for determining changes in a direction of travel of said body, said first turning angle detector being turnable with said body;

correction means for determining an error correction factor for correcting errors of said first turning angle detector, said correction means comprising:

a drive mechanism mounted on said body and connected to said first turning angle detector for turning said first turning angle detector relative to said body to cause said first turning angle detector to sense a turning angle in response thereto;

a second turning angle detector mounted on said body for detecting an actual turning angle of said first turning angle detector in response to turning of said first turning angle detector relative to said body; and control means for comparing said sensed turning angle sensed by said first turning angle detector with said actual turning angle detected by said second turning angle detector, to determine an error correction factor for correcting said errors in said sensed turning angle.

2. The apparatus according to claim 1, wherein said drive mechanism includes a rotary member, said second turning angle detector arranged to detect a number of rotations of said rotary member.

3. The apparatus according to claim 2, wherein said second turning angle detector comprises a magnetic member connected to said rotary member for rotation therewith, and a magnetic field sensor for detecting the number of rotations of said magnetic member.

4. The apparatus according to claim 1, wherein said first turning angle detector is surrounded by a vibration damping structure.

5. The apparatus according to claim 1, wherein said drive mechanism includes a speed reduction gearing.

6. A method of controlling a movable robot having a body on which is mounted a turning angle detector for determining changes in a direction of travel of said body by sensing a turning angle of said body, said method comprising compensating for errors of the sensed turning angle sensed by said turning angle detector by the steps of:

A) turning said turning angle detector relative to said body, while said body is stationary, by activating a turning mechanism mounted on said body;

B) detecting an actual turning angle of said turning angle detector by a sensor mounted on said body;

C) comparing said actual turning angle of said turning angle detector with a sensed turning angle thereof sensed by said turning angle detector, to determine an error correction factor for correcting said sensed turning angle;

D) moving said body along a course of travel while said turning angle detector turns with said body and senses turning angles of said body; and E) correcting said sensed turning angles in accordance with said error correction factor.

7. The method according to claim 6, wherein step A further comprises turning said turning angle detector at least once in a first direction, and thereafter at least once in the opposite direction; step C comprising determining an error correction factor with respect to turning in each direction.

8. The method according to claim 7, wherein said turning angle detector comprises an angular velocity sensor which emits an electrical output in accordance with turning velocity; step A comprising measuring electrical outputs from said angular velocity sensor at predetermined time intervals while turning said angular velocity sensor in said one direction and integrating the measured outputs; determining whether the angular velocity sensor has been turned a predetermined number of times; step C being performed only after said angular velocity sensor has been turned said predetermined number of times; and repeating said measuring and integrating steps in relation to turning in said opposite direction.

9. The method according to claim 8, wherein step A further comprises controlling a turning velocity of said turning mechanism at predetermined time intervals while said angular velocity sensor is turned in said one direction and in said opposite direction.

10. The method according to claim 6, further including, subsequent to step E, the step of determining whether travel of said body has been completed.

11. The method according to claim 6, wherein step B comprises detecting a number of rotations of a rotatable component of said turning mechanism.

* * * * *